(12) United States Patent
George

(10) Patent No.: US 7,093,905 B1
(45) Date of Patent: Aug. 22, 2006

(54) THREADING DEVICE FOR INSTALLING A CHILD'S CAR SEAT

(76) Inventor: Deanna L. George, 19450 Audrain Road–918, Mexico, MO (US) 65265

( * ) Notice: Subject to any disclaimer, the term of this patent is extended or adjusted under 35 U.S.C. 154(b) by 0 days.

(21) Appl. No.: 11/030,552

(22) Filed: Jan. 6, 2005

(51) Int. Cl.
*A47C 31/00* (2006.01)

(52) U.S. Cl. .................................................. 297/463.1

(58) Field of Classification Search ............. 297/463.1, 297/463.2, 482, 250.1, DIG. 6; 81/488; 29/278, 270; 280/727, 801.1
See application file for complete search history.

(56) References Cited

U.S. PATENT DOCUMENTS

| | | | |
|---|---|---|---|
| 5,197,176 A | 3/1993 | Reese | |
| 5,496,083 A | 3/1996 | Shouse, Jr. | |
| 5,620,231 A | 4/1997 | Marker et al. | |
| 5,902,015 A * | 5/1999 | Allcock | 297/463.1 |
| 5,954,397 A | 9/1999 | Czernakowski et al. | |
| 6,430,797 B1 * | 8/2002 | Dittmar et al. | 29/278 |
| 2002/0062543 A1 | 5/2002 | Dittmar et al. | |
| 2002/0092135 A1 | 7/2002 | Mancini et al. | |
| 2004/0080203 A1 * | 4/2004 | Meloul | 297/463.1 |

* cited by examiner

*Primary Examiner*—Milton Nelson, Jr.
(74) *Attorney, Agent, or Firm*—Polster, Lieder, Woodruff & Lucchesi, L.C.

(57) ABSTRACT

A car seat that rests on a seat of an automotive vehicle is secured with a restraint system including a seat belt having lap and shoulder sections, a coupler including a latch plate located between the two seat belt sections and a buckle located along the seat. A threader sleeve is installed over the shoulder section behind the latch plate and with tabs attached to the lap section. Then with the sleeve, which is considerably stiffer than the belt, the shoulder and lap sections and the latch plate which separates them are pushed through a channel in the car seat, to present the latch plate on the other side of the seat where it is engaged with the buckle. The tabs are released and the sleeve is withdrawn over the shoulder section to a position remote from the seat.

22 Claims, 4 Drawing Sheets

US 7,093,905 B1

THREADING DEVICE FOR INSTALLING A CHILD'S CAR SEAT

CROSS-REFERENCE TO RELATED APPLICATIONS

None.

STATEMENT REGARDING FEDERALLY SPONSORED RESEARCH

Not applicable.

BACKGROUND OF THE INVENTION

This invention relates in general to the securement of car seats for children and more particularly to a threading device for threading a seat belt through a child's car seat.

By law one who transports a child in an automobile must confine that child in child's car seat. Typically, the child's car seat rests on a rear seat of the automobile where it is secured firmly in place with one of the seat belts for the rear seat. To this end, the child's car seat has channels, through which the lap section and the shoulder section of a three-point seat belt fit. Beyond the channels, a latch plate between the two sections snaps into a mating buckle on the seat, all to prevent the child's car seat from displacing on the rear seat of the vehicle. Should the vehicle experience a sudden stop, the seat belt at the rear seat will restrain the child's car seat, while the car seat will restrain the child.

The car seat itself is easy enough to place on the rear seat of the vehicle, but the seat belt, owing to the flexibility of its two sections, is not easily threaded through the channels of the backrest. Indeed, it is physically awkward and often frustrating procedure.

DETAILED DESCRIPTION OF THE INVENTION

Figure 1:
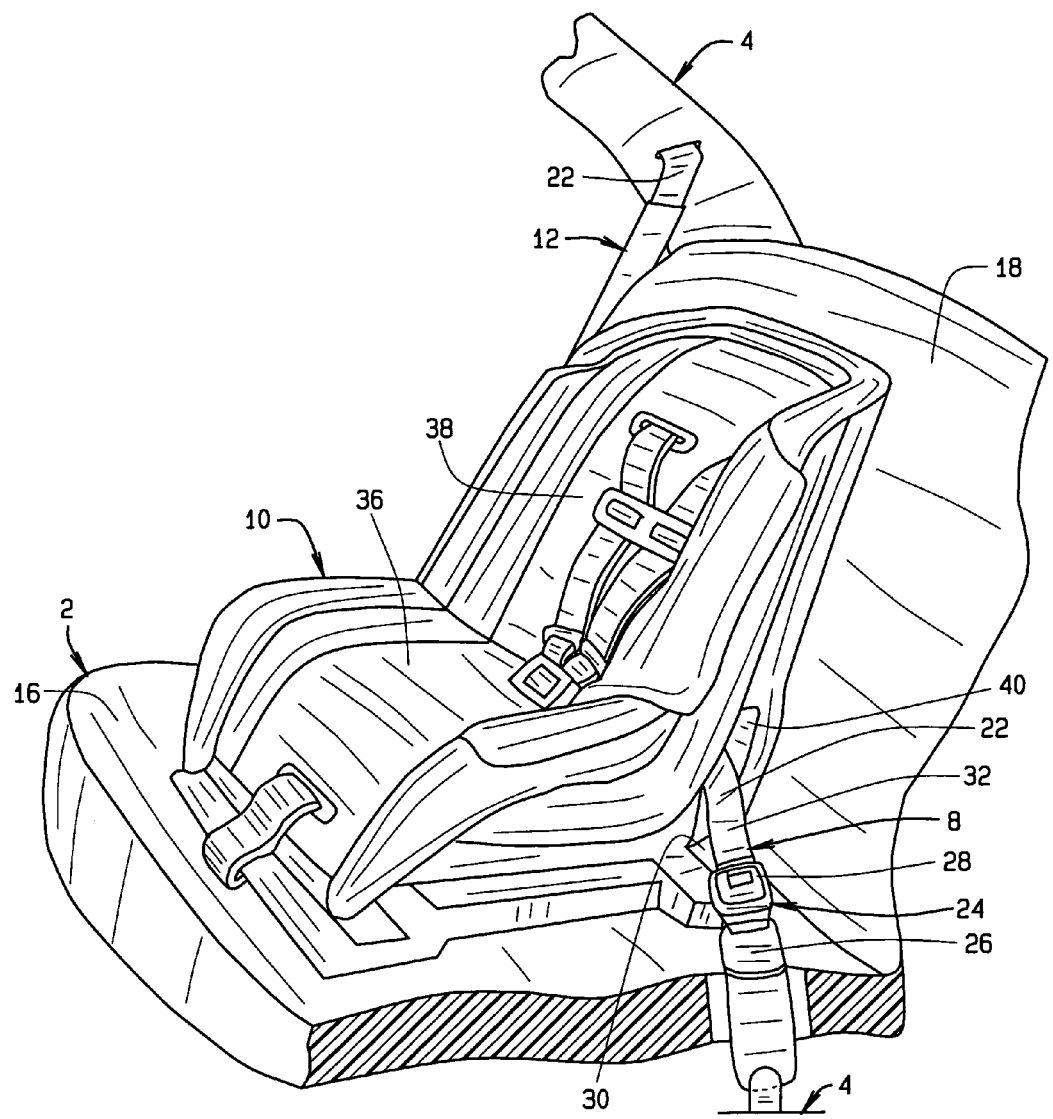
FIG. 1 is a perspective view of a child's car seat secured to a vehicle seat with a restraint system, the seat belt of which has been threaded through the car seat with a threading device constructed in accordance with and embodying the present invention.

Referring now to the drawings, an automotive vehicle has a seat 2 (FIGS. 1 & 2) located adjacent to several structural members 4 and a restraint system 8 which is attached to the structural members 4. Normally, the restraint system 8 restrains an occupant of the seat 2, but it may also be used to restrain a child's car seat 10, preventing it from displacing forwardly should the vehicle undergo a sudden deceleration as well as preventing it from shifting laterally. The restraint system 8 is fitted to the car seat 10 with a threading device 12 that facilitates installation, making it considerably easier and quicker than the conventional procedure.

Figure 5:
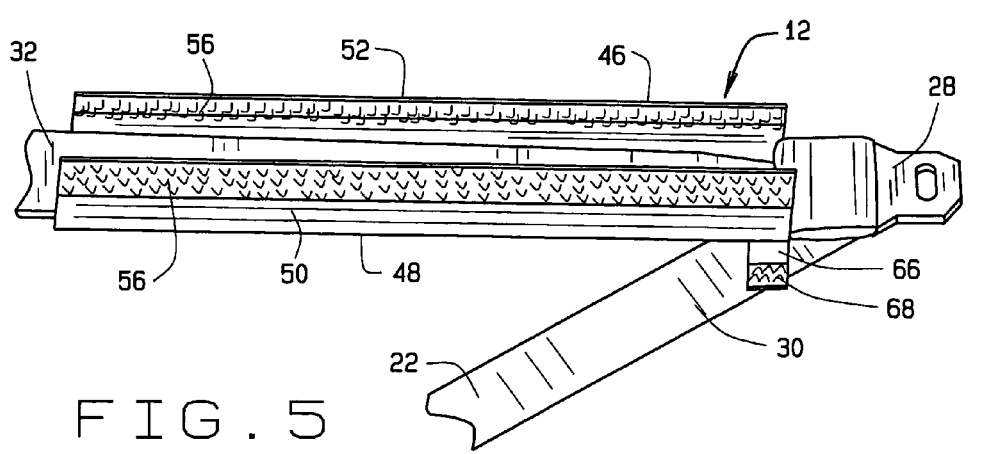
FIG. 5 is a perspective view of the threading device being fitted to the shoulder section of the seat belt.
Figure 6:
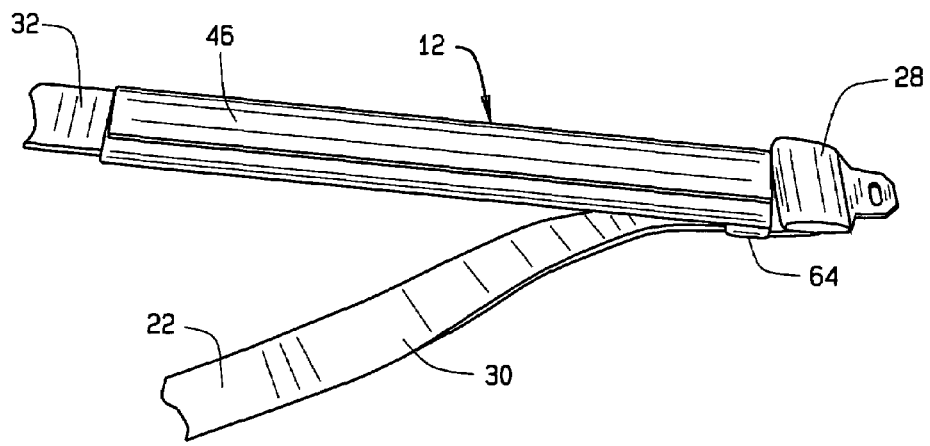
FIG. 6 is a perspective view of the threading device installed on the seat belt.

The vehicle seat 2 includes (FIG. 1) a seat cushion 16 and a backrest 18. The former lies generally horizontally, whereas the latter rises above it at a substantial angle close to vertical. Both the seat cushion 16 and backrest 18 tie along structural members 4 in the vehicle. The restraint system 8 is of the three-point variety. It includes a seatbelt 22 and a coupler 24, the latter of which has a buckle 26 that is attached to one of the structural members 4, normally below the seat cushion 16, and a latch plate 28 that is on the belt 22. Indeed, the latch plate 28 separates the belt 22 into a lap section 30 and a shoulder section 32, and thus lies at one end of each section 30 and 32 (FIG. 5). The other end of the lap section 30 attaches securely to one of the structural members 4, generally below the seat cushion 16, whereas the other end of the shoulder section 32 attaches securely to another of the structural members 4, such as a doorpost, generally above the backrest 18. The latch plate 28 may slide easily over the belt 22 or it may be attached securely to the ends of the lap and shoulder sections 30 and 32. The restraint system 8 also includes a retraction device that maintains the belt 22 taut both when in use and when stored. In this regard, when no one occupies the vehicle seat 2, the retraction device will maintain the belt 22 reasonably taut along the side of the seat 2 where it extends between the two points of attachment at that side of the seat 2. However, when an individual occupies the seat 2, that individual should bring the belt 22 across his or her lap and over one shoulder to thereafter couple the latch plate 28 to the buckle 26. Thus, the lap section 30 restrains the user at that individual's pelvis, while the shoulder section 32 extends diagonally over the user's chest and one shoulder to further restrain the individual's torso.

The child's car seat 10 rests on the vehicle seat 2 and is restrained by the restraint system 8 (FIG. 1). The seat 10 is typically molded from a polymer as an integral unit, save for a cushion and safety straps on it, and includes a seating portion 36 and a back portion 38. The seating portion 36 lies over the seat cushion 16 of the vehicle seat 2, whereas the back portion 38 rises along the backrest 18 of the seat 2 and indeed is against the backrest 18. The back portion 38 at each of its sides has channels 40 (FIGS. 1, 2 & 7) designed to receive a seat belt, such as the seat belt 22. The channels 40 resemble and are oriented such that they are much taller than they are deep. In other words, their major axes are generally vertical or more precisely, generally parallel to the backrest 18 of the seat 2.

Figure 3:
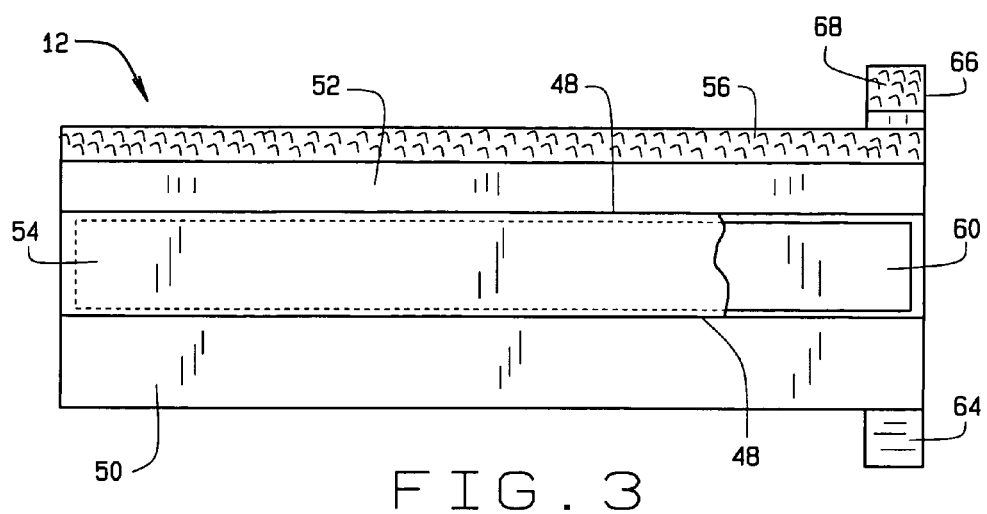
FIG. 3 is a plan view of the threading device with the flaps of its threader sleeve open.
Figure 4:
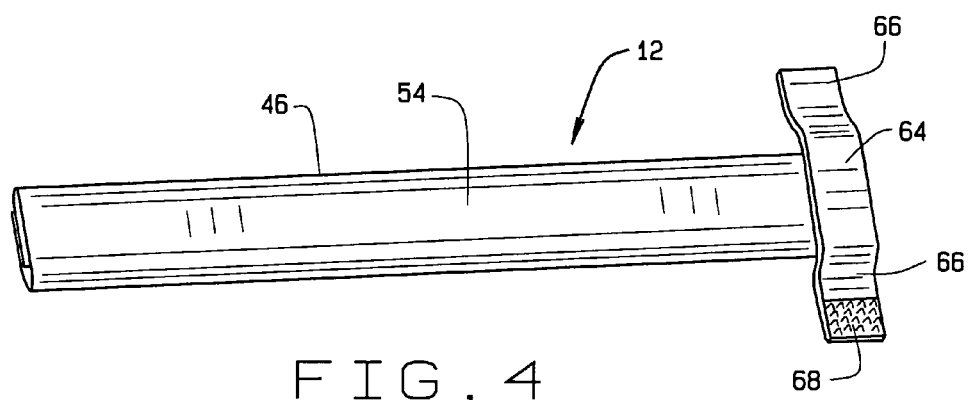
FIG. 4 is a perspective view of the threading device with the flaps of its threader sleeve closed and the tabs of its neck strap open.

The threading device 12 includes (FIGS. 3 & 4) a stiffening member in the form of a threader sleeve 46, which is at least as long as the back portion 38 of car seat 10 is wide at the channels 40. The sleeve 46 is formed from an initially open piece of sheet material, such as vinyl, that is somewhat flexible and capable of folding over on itself. Indeed, the sleeve 46 contains two folds 48 which are parallel and divide the sleeve 46 into an outside flap 50, an inside flap 52, and an intermediate section 54 between the two flaps 48 and 50. The intermediate section 54 is only slightly wider then the seat belt 22, perhaps by ⅛ to ¼ inch, while the two flaps 50 are somewhat narrower than the intermediate section 54, yet are wide enough to overlap when folded over onto the intermediate section 54. The inside flap 50 folds over the intermediate section 54 at its fold 48 and lies over much of the intermediate section 54. The outside flap 52 folds over the intermediate section 54 and also over a portion of the inside flap 50. In the region of overlap the two flaps 50 and 52 are provided with fastening devices 56 that are capable of engaging and disengaging each other. Of course, when the fastening devices 56 are engaged, the flaps 50 and 52 are attached, the former over the latter, and both over the intermediate section 54, producing a tubular or sleeve-like configuration. When the fastening devices 56 are disengaged, the two flaps 50 and 52 may fold along their respective fold 48 away from the intermediate section 54. Preferably the fastening devices 56 are hook and pile strips, such as VELCRO fasteners, but other types of fastening devices, such as snaps, buttons and zippers will suffice.

The intermediate section 54 actually constitutes two plies of the flexible material, from which the sleeve 46 is formed, arranged such that a pocket exists between the two plies. This pocket contains a stiffening strip 60, which while being flexible, is considerably stiffer then the flexible sheet material of which the sleeve 46 is otherwise constituted. The strip 60 imparts a measure of stiffness to the sleeve 46, and enables it to be threaded through objects without folding back upon itself. Plastic, a fiberboard such as MASONITE board or spring steel will suffice for the strip 60, thus enabling it to serve as a stiffening element.

In addition to the threader sleeve 46, the threading device 12 includes a capturing element in the form of a neck strap 64 (FIGS. 3–6) which is attached to the threader sleeve 46 at one end of the sleeve 46. Actually, the strap 64 is stitched to the intermediate section 54 of the threader sleeve 46 and extends transversely across it and also beyond the sleeve 46 in form tabs 66 that are likewise provided with fastening devices 68. The tabs 66 are long enough to fold over the inside and outside flaps 50 and 52 when the flaps 50 and 52 themselves are folded over onto each other, and when the tabs 66 are so folded they overlap and may be attached to each other with their fastening devices 68. Like the fastening devices 56, the fastening devices 68 are preferably strips of hook and pile material, such as VELCRO fasteners, or they may take other forms such as snaps or buttons.

To secure the child's car seat 10 on the vehicle seat 2 with the aid of the threading device 12, one initially places the car seat 10 on the vehicle seat 2 with the seating portion 36 of the car seat 10 over the seat cushion 16 of the vehicle seat 2 and the back portion 38 of the car seat 10 along the backrest 18 of the vehicle seat 2, all while the seat belt 22 of the restraint system 8 is fully retracted or at least out of the way of the car seat 10. As such the latch plate 28 lies between the ends of the belt 22 along one of the structural members 4 of the vehicle. Thereupon, one fits the threading device 12 to the shoulder section 32 of the seat belt 22, and also couples it with the lap section 30. To this end, the flaps 50 and 52 of the threader sleeve 46 are separated and opened as are the tabs 66 of the neck strap 64. The exposed intermediate section 54 is then laid along the shoulder section 32 of the belt 22 with the neck strap 64 closest to the latch plate 28 (FIG. 5). The flaps 50 and 52 of the sleeve 46 are then folded over the shoulder section 32, with the outside flap 50 over the inside flap 52. The fastening devices 56 on the two flaps 50 and 52 engage, securing the two flaps 50 and 52 together and capturing the shoulder section 32 within the threader sleeve 46. Next the threader sleeve 46 is advanced over the shoulder section 32 until its end that is fitted with the strap 64 abuts the latch plate 28 of the coupler 24. Thereupon the two sections 30 and 32 of the belt 22 are pinched together, and the tabs 66 of the neck strap 64 are folded over them and secured with their fastening devices 68. This secures the two sections 30 and 32 of the belt 22 together immediately behind the latch plate 28. At this juncture the seat belt 22 is ready to be threaded through the car seat 10.

Figure 2:
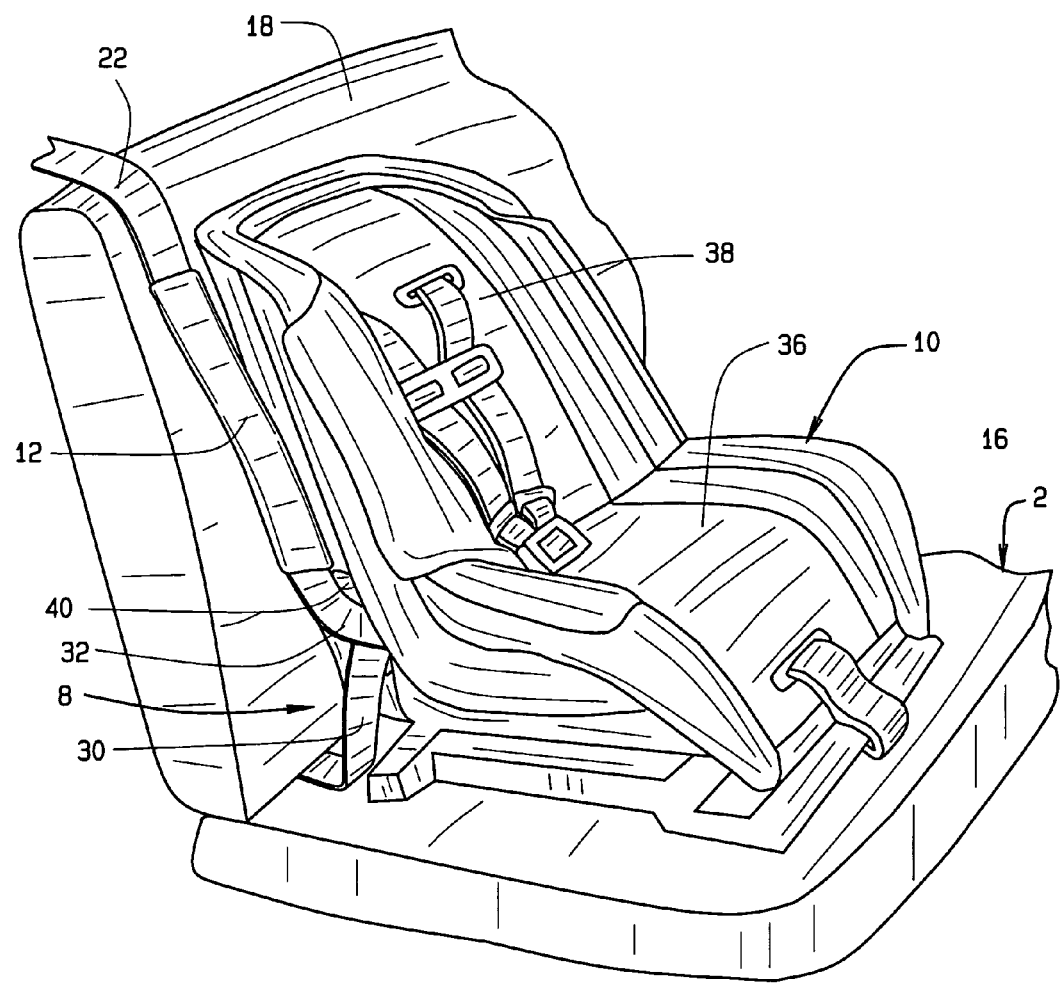
FIG. 2 is a perspective view similar to FIG. 1, but showing the other side of the car seat.
Figure 7:
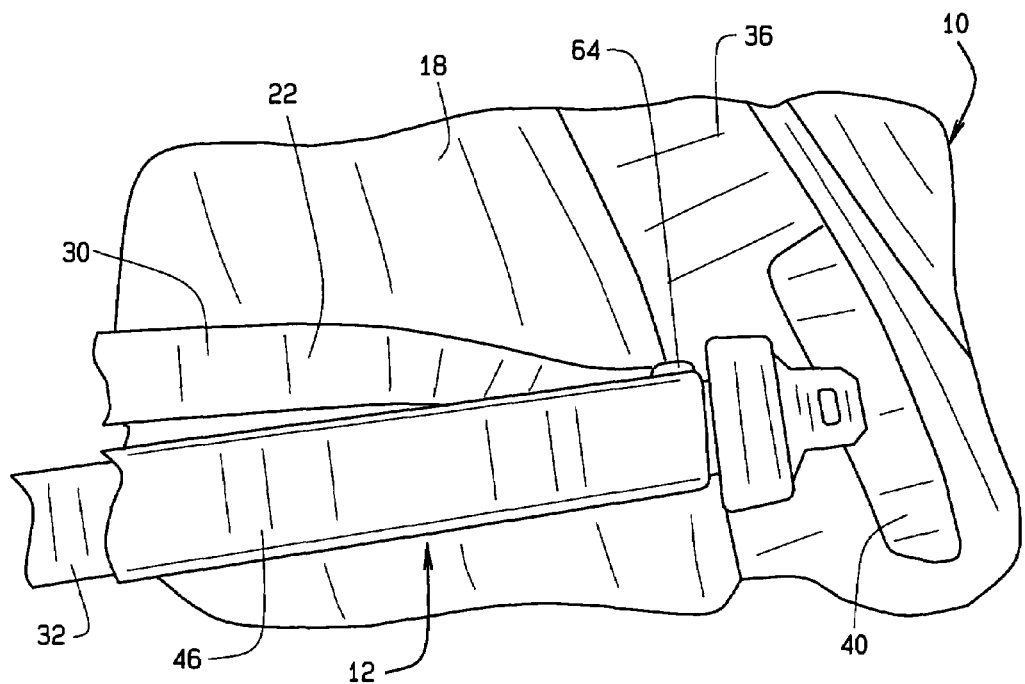
FIG. 7 is a perspective view of the threading device installed on the seat belt and with a channel in the car seat to facilitate advancement of the seat belt through the channel.

To this end, one grasps the threader sleeve 46 with the shoulder section of the belt 22 encased in it and inserts the threader sleeve 46, with the latch plate 28 of the coupler leading, into the nearest channel 40 in the back portion 38 the seat 10 (FIG. 7). Using the stiffened sleeve 46 to push the latch plate 28 through the first channel 40, one aligns the latch plate 28 with the remaining channel 40 or channels 40 and advances the trailing lap and shoulder sections 30 and 32 through those channels 40 as well. The latch plate 28 emerges from the far channel 40 and the back portion 38 of the car seat 10, whereupon one grasps it and pulls the trailing shoulder section 32 and lap section 30 of the seat belt 22 further through the channels 40. At this juncture one engages the latch plate 28 of the coupler 24 with the buckle 26. One also releases the tabs 66 of the neck strap 60, thus freeing the threader sleeve 46 from the lap section 30, but not from the shoulder section 32. The sleeve 46 is then retracted over the shoulder section 32 until it is free of the car seat 10. One then pulls on the shoulder section 32 to draw the lap section 30 taut in the channels 40 of the car seat 10. The threader sleeve 46 remains around the shoulder section 32 remote from the seat 10, generally between the seat 10 and the structural member 4 to which the shoulder section 32 is attached (FIGS. 1 & 2). While the threading device 12 may be detached from the belt 22 once the car seat 10 is secured, it can remain around the shoulder section 32 to again be used in the installation of the car seat 10, should the car seat 10 be removed from and then reinstalled on the vehicle seat 2.

Variations are possible. For example, the threader sleeve 46 may be installed over the lap section 30 of the belt 22 and the tabs 66 extended around the shoulder section 32. Also, the buckle 26 of the coupler 24 may be located on the belt 22 and the latch plate 28 attached to the structural member 4.

PARTS LIST 2 vehicle seat
4 structural members
6
8 restraint system
10 child's car seat
12 threading device
16 seat cushion
18 backrest
22 belt
24 coupler
26 buckle
28 latch plate
30 lap section
32 shoulder section
36 seating portion
38 back portion
40 channels
46 threader sleeve
48 folds
50 inside flap
52 outside flap
54 intermediate section
56 fastening devices
60 stiffening strip
64 neck strap
66 tabs
68 fastening devices

The invention claimed is:

1. In combination with a seat in an automotive vehicle, with the seat having a cushion and a backrest, and also in combination with a restraint system at the seat, with the restraint system including a coupler and a belt, with the coupler having first and second engageable members and the belt having lap and shoulder sections separated by the second coupler member, and further in combination with a child's car seat having a seating portion located over the seat cushion of the vehicle seat and a back portion located along the backrest of the vehicle seat, the back portion having a channel for receiving the lap and shoulder sections of the seat belt;

a threading device for facilitating securement of the car seat on the vehicle seat with the restraint system, said threading device comprising:

a stiffening member fitted to one of the sections of the seat belt and having one end at the second coupler member and another end remote from the second coupler member, the stiffening member extending along the one section of the seat belt and being attached to the one section at and remote from the second coupler member, the stiffening member being stiffer than the seat belt, so that the seat belt, where the stiffening member is fitted to it, may be pushed through the channel in the back portion to present the second coupler member at the first coupler member.

2. The combination according to claim 1 wherein the stiffening member, when it is fitted to the one section of the seat belt, leaves the second coupler member exposed such that the second coupler can be engaged with the first coupler member.

3. The combination according to claim 1 wherein the threading device includes a capturing element on the stiffening member for holding the other section of the seat belt immediately behind the second coupler member.

4. The combination according to claim 1 wherein the stiffening member is a sleeve that encases the section of the seat belt to which it is fitted immediately behind the second coupler member.

5. The combination according to claim 4 wherein the sleeve is capable of being opened so that one of the sections of the seat belt may be placed in the sleeve.

6. The combination according to claim 5 wherein the sleeve has flaps and an intermediate portion between the flaps, so that the flaps can fold between open and closed positions, and fastening devices for holding the flaps together to encase said one section of the belt in the sleeve.

7. The combination according to claim 6 wherein the intermediate portion of the sleeve contains a stiffening element.

8. The combination according to claim 4 wherein the threading device also includes a connecting element for temporarily attaching the sleeve to the other section of the seat belt immediately behind the second coupler member.

9. The combination according to claim 8 wherein the connecting element comprises at least one tab that is attached to the sleeve and fits over the other section of the seat belt.

10. The combination according to claim 8 wherein the connecting element comprises a pair of tabs that fit over the other section of the seat belt and fastening devices for releasably holding the tabs together around the other section.

11. The combination according to claim 4 wherein the sleeve encases the shoulder section of the seat belt and the connecting element fits around the lap section.

12. The combination according to claim 1 wherein the stiffening member is a as long as the back portion of the child's car seat is wide.

13. A process for installing a child's car seat on the seat of an automotive vehicle, said process comprising:

placing the child's car seat on the seat of the automotive vehicle;

fitting a stiffening device to a segment of a seat belt immediately behind a first coupling member on the seat belt and also remote from the first coupling member, so that the stiffening device extends along the segment of the seat belt away from the coupling member and does not separate from the segment both at the first coupling member and remote from the first coupling member;

with the stiffening device so fitted to the segment of the seat belt, pushing the segment of the seat belt, to which it is fitted, and the first coupling member through a channel in the child's car seat; and engaging the first coupling member with a second coupling member.

14. The process according to claim 13 wherein the seat belt has lap and shoulder sections which are separated by the first coupling member, and the segment of the seat belt to which the stiffening device is fitted is along one of the seat belt sections which lead up to the first coupling member.

15. The process according to claim 13 and further comprising coupling the stiffening device to the other section of the seat belt before the stiffening device is pushed through the channel.

16. The process according to claim 13 wherein the segment to which the stiffening device is fitted is on the shoulder section of the seat belt that normally fits over a user's shoulder.

17. The process according to claim 13 wherein the stiffening device includes a threader sleeve which fits over and encases the seat belt.

18. The process according to claim 17 wherein the stiffening device also includes tabs which are attached to the sleeve, and the process further comprises fitting the tabs around the other section of the seat belt and securing the tabs to hold the two sections of the seat belt together behind the first coupling member as the sleeve is pushed through the channel.

19. The process according to claim 18 and further comprising releasing the tabs after the two coupling members are engaged and retracting the sleeve from the channel of the car seat by sliding it over the seat belt section to which it is fitted.

20. The process according to claim 17 wherein the threader sleeve has flaps and an intermediate section between the flaps, with the flaps being connected to the intermediate section at folds; and wherein the threader sleeve is fitted to the segment of the seat belt section by opening the flaps, placing the segment of the seat belt along the intermediate section, and securing the flaps to each other.

21. In combination with a vehicular seat in an automotive vehicle, the seat having a seating cushion and a backrest; with a restraint system including a seat belt having lap and shoulder sections attached to structural members of the vehicle and also a latch plate between the lap and shoulder section and a buckle attached to a structural member of the vehicle; and with a child's car seat including a seating portion located over the seat cushion of the vehicle seat and a back portion along the backrest of the vehicle seat, the car seat having a channel opening laterally out of its sides;

a threading device for facilitating the installation of the child's car seat on the vehicle seat, said threading device comprising:

a sleeve fitted around one of the sections of the seat belt behind the latch plate and being stiffer than the seat belt; and tabs on the sleeve and fitted around the other section of the seat belt behind the latch plate.

22. The process according to claim 13 wherein the stiffening device, when it is fitted to the one section of the seat belt, leaves the first coupling member exposed such that the first coupling member can be engaged with the second coupling member.

* * * * *